Oct. 4, 1927.

M. L. DEARBORN 1,644,111

CAMBER MEASURING MEANS FOR VEHICLE WHEELS

Filed July 6, 1925

INVENTOR.
MORRIS L. DEARBORN
BY A. B. Bowman
ATTORNEY

Patented Oct. 4, 1927.

1,644,111

UNITED STATES PATENT OFFICE.

MORRIS L. DEARBORN, OF SAN DIEGO, CALIFORNIA.

CAMBER-MEASURING MEANS FOR VEHICLE WHEELS.

Application filed July 6, 1926. Serial No. 120,757.

My invention relates to a means for measuring the camber or vertical inclination or tilt of vehicle wheels and to a method of changing the camber thereof.

The objects of my invention are: First, to provide means of this class which may be easily, quickly and accurately applied to a vehicle wheel for measuring the camber or vertical inclination or tilt thereof; second, to provide a means of this class having mutually contractible members for gripping a vehicle wheel, the one member carrying a plumb bob and the other a means in connection with the plumb bob for indicating the camber or vertical inclination of the wheel; third, to provide a means of this class having mutually contractible members, each provided with extended arms for engaging a vehicle wheel and for supporting the means thereon, said members carrying a plumb bob and a scale for measuring the camber of the wheel; fourth, to provide as a whole a novelly constructed means of this class; fifth, to provide a novel method of applying a camber measuring means to a vehicle wheel; sixth, to provide a novel method of changing the camber of a vehicle wheel, and seventh, to provide a means for measuring the camber of vehicle wheels which is particularly simple and economical of construction, durable, simple to manipulate, accurate in its measurements, and one which will not readily deteriorate or get out of order.

Figure 1:
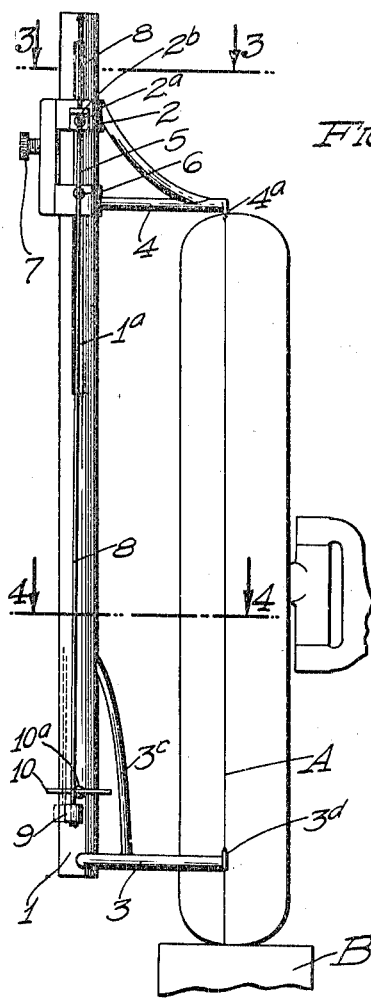
Figure 2:
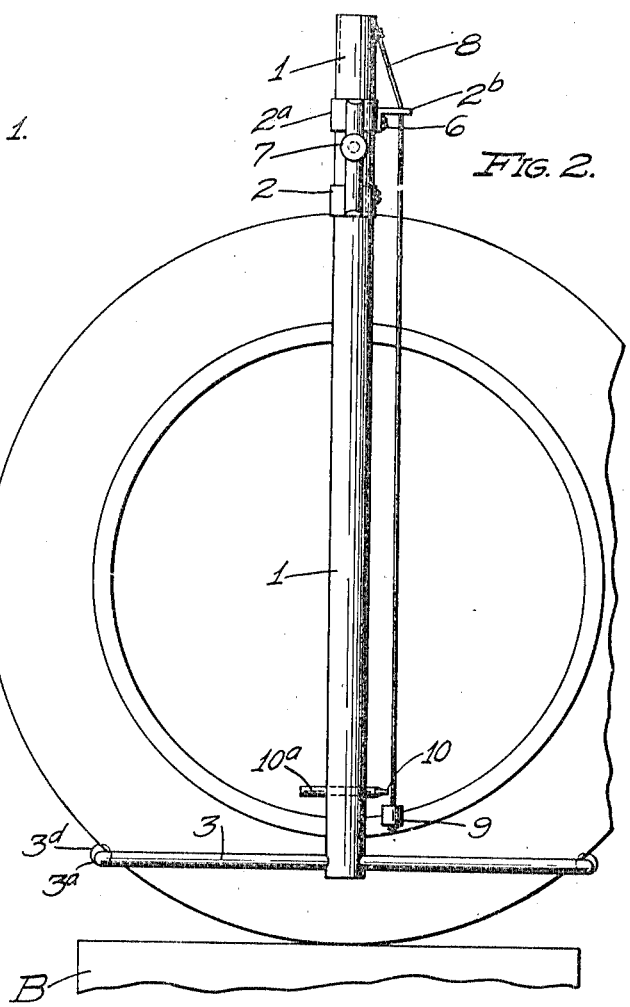
Figure 3:
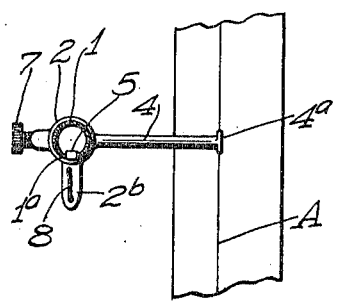

With these and other objects in view, as will appear hereinafter, the means of my invention consists of certain novel features of construction, combination and arrangement of parts and portions, as will be hereinafter described in detail and particularly set forth in the appended claims, reference being had to the accompanying drawings and to the characters of reference thereon, which illustrate the camber measuring means of my invention, in which:

Figure 1 is a side elevational view of my means, showing the same applied to and supported by an automobile wheel, the axle of the wheel and the means for supporting the same being shown fragmentarily; Fig. 2 is another elevational view, taken at a right angle to that of Fig. 1 and from the side of the wheel, showing the wheel fragmentarily; Fig. 3 is a sectional view thereof in plan, taken at 3—3 of Fig. 1, showing the wheel fragmentarily and Fig. 4 is another sectional view thereof in plan, taken at 4—4 of Fig. 1, showing the wheel fragmentarily and by dotted lines.

Like characters of reference refer to similar parts and portions throughout the several views of the drawings.

The main supporting member 1, slide 2, supporting arms 3 and 4, key 5, screws 6, thumbscrew 7, cord 8, weight or plumb bob 9, and the scale 10, constitute the principal parts and portions of my wheel camber measuring means.

Figure 4:
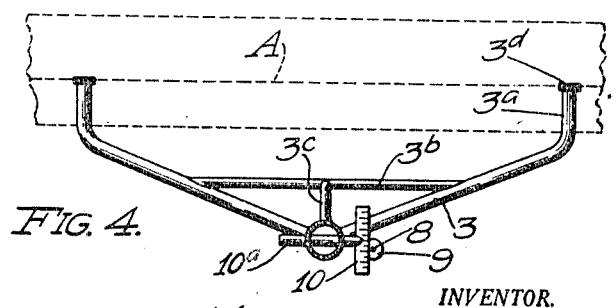

The main supporting member 1 consists preferably of a large tubular member to the lower end of which is secured a pair of supporting arms 3, which extend substantially in opposite directions from the tubular member 1 and then in the same direction from the tubular member as indicated by $3^a$ in Fig. 4. These arms 3 are preferably braced or reinforced with each other by a brace $3^b$ and with the tubular member 1 by means of a brace $3^c$ connecting the brace $3^b$ with the tubular member 1 a considerable distance above the lower end, as shown in Fig. 1.

At the upper end of the supporting or tubular member 1 is reciprocally mounted a slide 2, which may be of any desired construction but preferably provided with a long bearing portion for receiving the tubular member, said bearing portion as shown consisting of a pair of spaced apart bands $2^a$. Said slide is provided with a key 5 at its inner portion, which key extends between the two bands $2^a$ and is secured at its ends to said bands by means of screws 6, as shown in Figs. 1, 2 and 3. The upper end or portion of the member 1 is provided with a longitudinal key seat or slot $1^a$ for receiving the key 5 and for nonrotatably guiding the slide 2 longitudinally relative to the member 1. Said slide is secured temporarily in fixed relation to the member 1 by means of a thumb-screw 7 or other suitable means applied to the slide 2.

The slide 2 is provided at its one side with an arm 4 extending in the same general direction as the outer ends of the arms 3 and is positioned a considerable distance above the latter arms and intermediate the same.

The two arms 3 and the arm 4 provide a three-point means for supporting the measuring device or means on a vehicle wheel. At the outer ends of the arms 3 and 4 are provided relatively sharp jaws, claws or other suitably shaped gripping portions $3^d$ and $4^a$, respectively, which sharp portions extend toward a common center and are adapted for securely gripping the automobile tire of automobile wheels for supporting the measuring device or means thereon.

To the upper portion of the member 1 is secured a cord or plumb line 8, which extends through a hole or slot in an arm $2^b$ carried by and extending outwardly from the slide 2, said arm $2^b$ extending from the slide and supporting member at a right angle with the arms 4 and 3. The cord 8 extends to near the lower end of the supporting member 1 and is provided at its lower end with a weight or plumb bob 9.

At the corresponding side of the supporting member 1 and slightly above the plumb bob is provided a scale 10, which extends transversely of the longitudinal extent of the supporting member, said scale being adapted to measure the distance between the axial center of the member 1 and the plumb line. The scale 10 is preferably mounted at the end of a rod $10^a$, which is reciprocally and rotatably supported by the member 1 so that if the measuring means is not mounted in a truly vertical position on the wheel when viewed from the side of the wheel, the scale 10 may be withdrawn or shifted inwardly so as to bring the same near the plumb line.

In order to change the camber of the automobile wheel, the wheels are jacked up so that the same rotate freely. A circumferential mark of any suitable character is made on the periphery of the tire, as indicated by A in Figs. 1, 3 and 4. The wheels are then lowered on blocks B. The measuring device is then mounted on the wheel (one on each wheel) in such a manner that the sharp edges $3^d$ and $4^a$ at the outer ends of the arms 3 and 4, respectively, engage the tire at or on the line A. The present camber will be indicated by the plumb line on the scale. To change the camber, a suitable apparatus is applied on the axle for bending the same. Sufficient force is applied to the axle so that the plumb lines are shifted a predetermined distance beyond the actual camber desired, depending upon the quality and resiliency of the axle. If the camber in the wheels is too great, as shown by dotted lines of the plumb line in Fig. 1, the axle is bent so that the plumb line is shifted a considerable distance beyond the center of the scale, said distance being determined by experiment and is dependent upon the quality of the axle. The bending force on the axle is then released and the plumb bob and plumb line permitted to return with the wheel, showing the changed camber of the wheel on the scale, as shown by solid lines.

Though I have shown and described a particular construction, combination and arrangement of parts and portions of my camber measuring instrument or means and a certain method of changing the camber of wheels, I do not wish to be limited to this particular construction, combination and arrangement nor to the particular method, but desire to include in the scope of my invention the construction, combination and arrangement and the method substantially as set forth in the appended claims.

Having thus described my invention, what I claim as new and desire to secure by Letters Patent is:

1. In a measuring means, a pair of supporting members movable relative to each other, each being provided with arms extending therefrom for gripping the periphery of a round member to be measured at more than two portions, and a plumb bob means suspended from one of said supporting members.

2. In a measuring means, a pair of supporting members movable relative to each other, each being provided with arms extending therefrom and provided at their ends with sharp transversely extending jaws for gripping the periphery of a round member to be measured, a plumb bob means suspended from one of said supporting members, and a scale supported by the other supporting member adjacent said plumb bob means.

3. In a measuring means of the class described, a pair of supporting members movable relative to each other, one provided with a pair of arms and the other with a single arm, all of said arms extending from the same sides of said members, and a plumb bob means carried by one of said members for measuring displacements on the other member.

4. In a measuring means of the class described, a pair of supporting members movable relative to each other, one provided with a pair of arms and the other with a single arm, all of said arms extending from the same sides of said members and being attached thereto at one of their ends, the other ends of said arms being provided with sharp grip portions extending toward a common center for gripping the member to be measured, and a plumb bob means carried by one of said members for measuring displacements on the other member.

5. In a measuring means of the class described, a supporting means having three-point supporting jaws, said supporting means carrying a plumb bob means for measuring the displacements of the member on which the means is adapted to be supported by said jaws.

6. In a measuring means of the class described, an upright supporting means having three-point supporting jaws, said supporting means carrying a plumb bob means for measuring the displacements of the member on which the means is adapted to be supported by said jaws, and a scale carried by the lower portion of said supporting means adjacent the lower portion of said plumb bob means.

7. In a measuring means, a substantially vertical support, a slide reciprocally mounted in a vertical direction on said support, a pair of arms carried by the support at the lower portion thereof, a single arm carried by said slide, and a plumb bob means carried by said slide and extending to the lower portion of said support.

8. In a measuring means, a substantially vertical support, a slide reciprocally mounted in a vertical direction on said support, a pair of arms carried by the support at the lower portion thereof, a single arm carried by said slide, a plumb bob means carried by said slide and extending to the lower portion of said support, and a scale carried by said support adjacent the lower end of said plumb bob means.

9. In a measuring means, a substantially vertical support, a slide reciprocally mounted in a vertical direction on said support, a pair of arms carried by the support at the lower portion thereof, a single arm carried by said slide, the outer ends of said arms being provided with relatively sharp jaws extending substantially toward a common center, and a plumb bob means carried by said slide and extending to the lower portion of said support.

10. In a measuring means of the class described, a supporting means, means for supporting the supporting means on the member to be measured, said last mentioned means having sharp transverse edges extending toward each other for engaging a peripheral line on the member to be measured, a plumb bob means carried by said supporting means, and a scale shiftably mounted on said supporting means and shiftable relative to said plumb bob means.

In testimony whereof, I have hereunto set my hand at San Diego, California, this 22d day of June, 1926.

MORRIS L. DEARBORN.